C. R. EVANS.
WIRE ASSEMBLING MACHINE.
APPLICATION FILED MAR. 12, 1917.

1,249,053.

Patented Dec. 4, 1917.
5 SHEETS—SHEET 1.

INVENTOR.
Charles R. Evans
BY Robert M Pierson
ATTORNEY

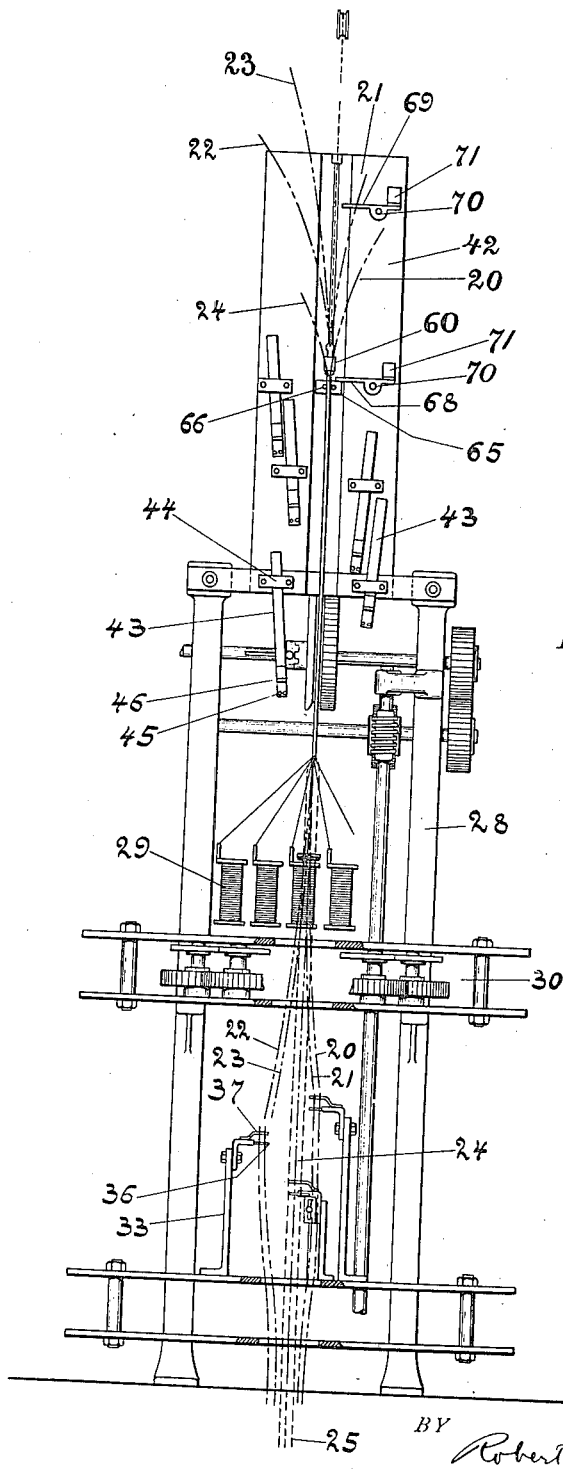

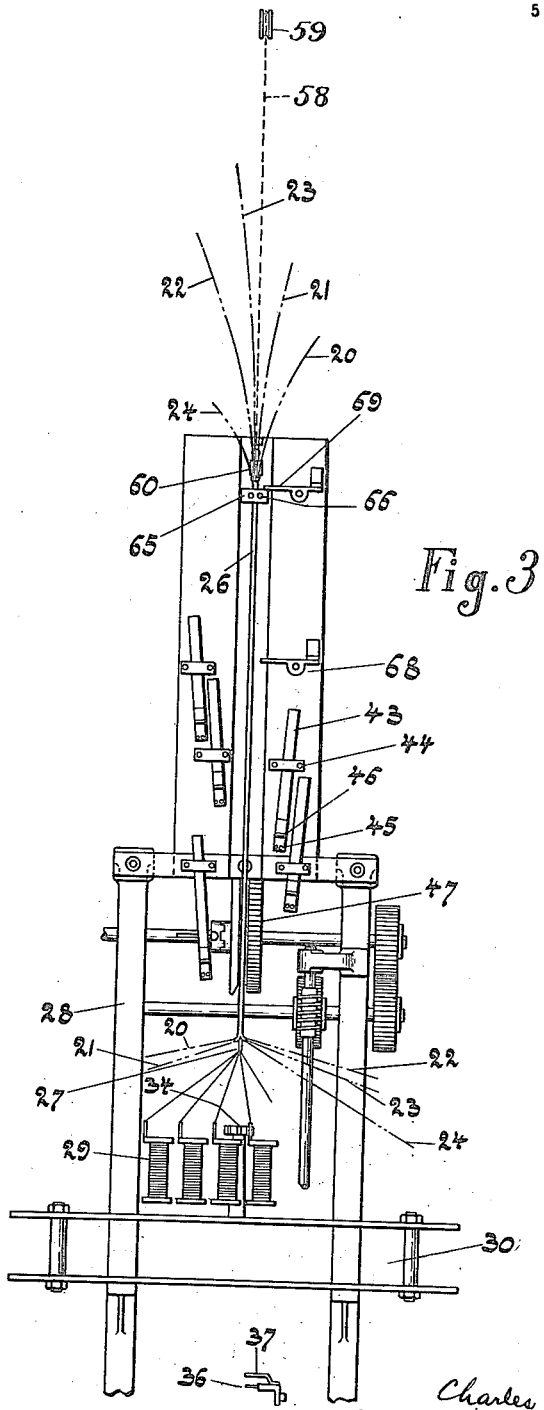

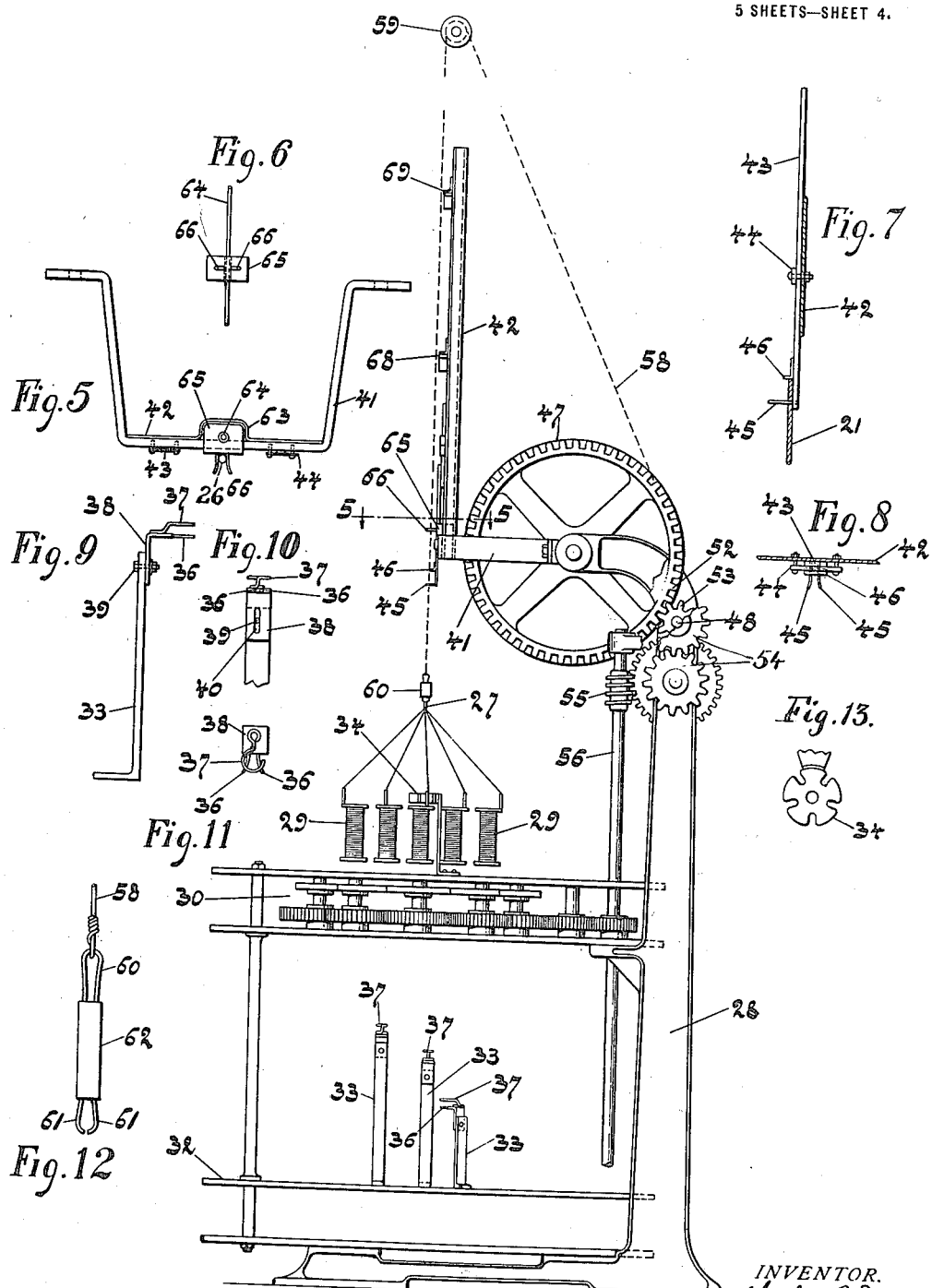

C. R. EVANS.
WIRE ASSEMBLING MACHINE.
APPLICATION FILED MAR. 12, 1917.
1,249,053.
Patented Dec. 4, 1917.
5 SHEETS—SHEET 5.
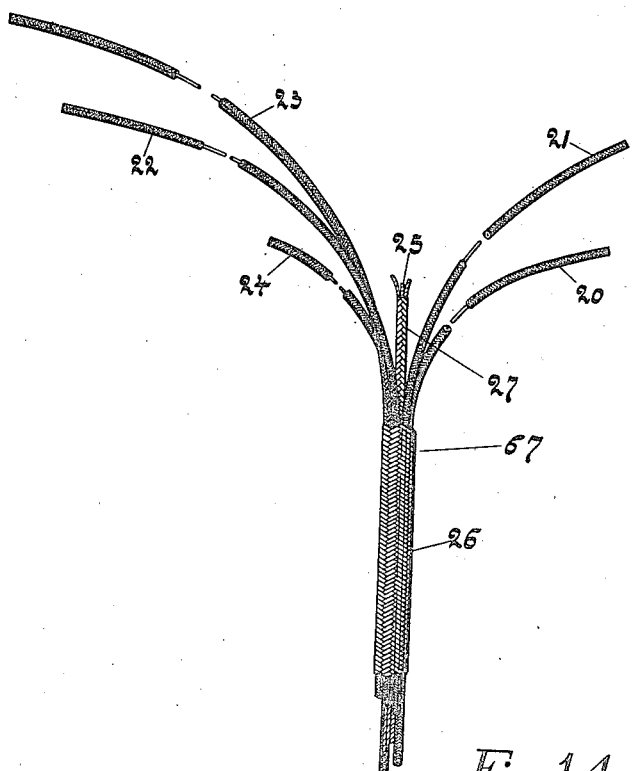
Fig.14
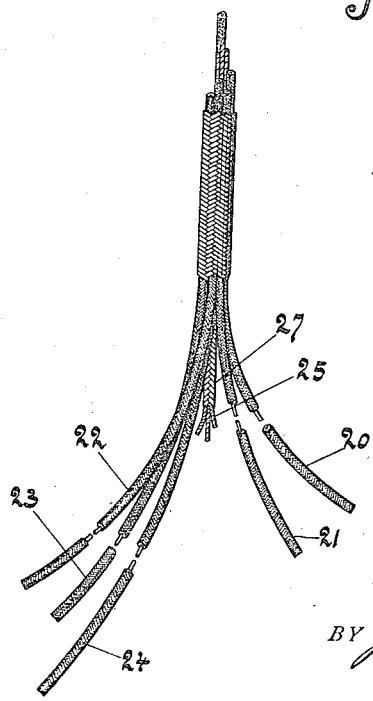
INVENTOR.
Charles R. Evans
BY Robert M Pierson
ATTORNEY

UNITED STATES PATENT OFFICE.

CHARLES R. EVANS, OF AKRON, OHIO, ASSIGNOR TO THE B. F. GOODRICH COMPANY, OF NEW YORK, N. Y., A CORPORATION OF NEW YORK.

WIRE-ASSEMBLING MACHINE.

1,249,053.            Specification of Letters Patent.        Patented Dec. 4, 1917.

Application filed March 12, 1917. Serial No. 154,117.

*To all whom it may concern:*

Be it known that I, CHARLES R. EVANS, a citizen of the United States, residing at Akron, in the county of Summit and State of Ohio, have invented certain new and useful Improvements in Wire-Assembling Machines, of which the following is a specification.

This invention relates to machines for making assemblies of insulated wires terminating at different lengths or end-positions with reference to each other, and bound together in a bundle by suitable means such as a braided outer covering. Wire assemblies of this kind are used in the ignition and lighting systems of automobiles, and the different lengths or positions of the wire ends are calculated with reference to certain relative positions of the binding posts on the vehicle. My invention provides a system of gages and fasteners in connection with the braiding machine whereby the several wires may be started with their upper ends in the proper relative positions before the braiding commences, and may be cut off at the proper relative lengths after the braiding has proceeded for a definite distance; and whereby also the ends of the wires may be temporarily secured or located on the machine, on one or both sides of the braiding point, at appropriate stages of the operation, as will more fully appear. The invention further includes certain improvements in the feeding mechanism.

Of the accompanying drawings,

Fig. 2 is a similar view showing the work in position at the time when the braiding is partially complete and the lower ends of the wires are to be cut off.

Fig. 3 is a similar view of the upper part of the machine showing the position of the work at the completion of the braiding operation.

Fig. 4 is a side elevation of the machine.

Fig. 5 is a plan view of certain parts viewed from the plane 5—5 of Fig. 4, this and subsequent views being on a larger scale than Figs. 1 to 4.

Fig. 6 is a front elevation of certain parts shown in Fig. 5.

Fig. 7 is a side elevation and Fig. 8 is a plan view of one of the upper gaging and wire-holding devices.

Fig. 9 is a side elevation of one of the lower gaging and wire-holding devices, and Figs. 10 and 11 are respectively a front elevation and a plan view of the latter.

Fig. 12 is a front elevation of the puller clamp for drawing the wires upwardly through the braiding machine.

Fig. 13 is a plan view of the wire guide located just below the braiding point.

Fig. 14 is an elevation of the product of the machine, partly broken away.

Figure 1:
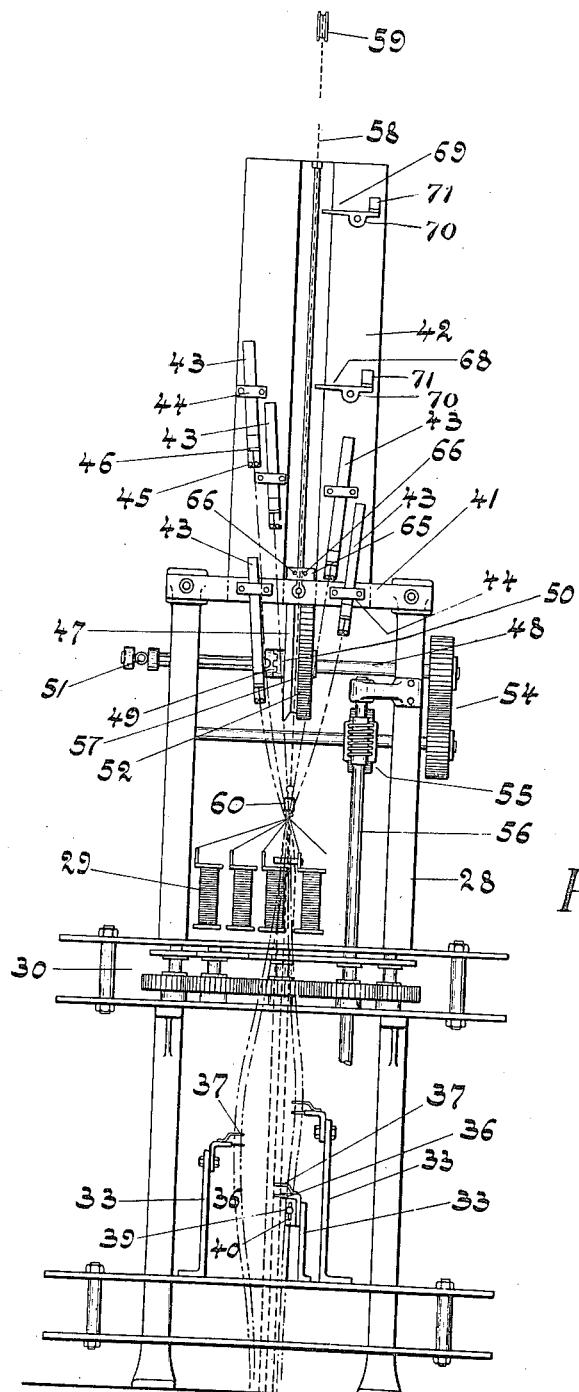
Figure 1 is a front elevation showing the principal parts of a braiding machine provided with wire-end-gaging and securing devices embodying my invention, the work being shown in the position occupied just before the braiding commences.

Referring to Fig. 14, the particular bundle, assembly or cable of wires here shown consists of five insulated wires 20, 21, 22, 23, 24 grouped around a central core 25, which may be composed of hemp strands, for giving a round form to the cable, said cable being provided with a braided fibrous covering 26 for a portion of its length, which covering is continued over the hemp core as a narrower terminal sheath 27, at each end. The wires terminate at five different lengths or relative end-positions at their upper ends, and at three different lengths or relative end-positions at their lower ends, but of course these end-positions may vary according to requirements.

28 is the frame of a braiding machine of the ordinary type having in this case a single set of spools 29 together with their operating mechanism 30 for forming the braided sheath.

On the lower frame-platform 32 are mounted three brackets 33, 33 of different heights, each carrying at its upper end a pair of flaring prongs 36 (shown in detail in Figs. 9, 10, and 11) forming a temporary catch or fastener for frictionally holding the end of a wire or pair of wires, and above said catch a gage 37 for the hand shears or other wire-severing tool, looped or hooked in a horizontal plane to form a wire guide. The members 36, 37 are mounted on an L-shaped plate 38, which is secured on its bracket by a bolt 39 occupying a slot 40 in the plate so that said plate may be vertically adjusted.

On a U-shaped frame-member 41 and a vertical plate 42 supported thereby, are mounted five rods or holders 43 secured by bolted clamps 44 and adjustable as to their vertical positions on loosening said clamps, these holders being shown in detail in Figs. 7 and 8, and each having at its lower end a pair of fastening prongs 45 similar to the ones 36, and above that an L-shaped stop-plate 46, said plate serving as a gage or stop for positioning the upper end of one of the wires, as indicated in Figs. 1 and 7, while the prongs 45 temporarily fasten the wire by frictional engagement therewith.

34 is a multiple wire and core guide located just below the braiding point.

47 is a drum or pulley wheel, having gear-teeth 52 on its periphery engaging the teeth of a pinion 53, the latter being loosely mounted on a shaft 48 to which is splined a jaw-clutch member 49 adapted to engage a complemental clutch-member 50 on the hub of the pinion and slidable along the shaft by means of a manual operating member 51.

The shaft 48 is rotated through gearing 54 to which power is communicated in any suitable manner, said gearing being connected with the spool-operating mechanism 30 through suitable worm gearing 55 and a vertical shaft 56.

Secured to the periphery of pulley wheel 47 and mounted in a groove 57 on said periphery is one end of a wire cord or cable 58 which passes upwardly over a guide pulley 59 and downwardly in front of the plate 42, said cord having at its forward end a puller clamp 60 for attachment to the work to draw the latter upwardly while the covering is being braided around it. This clamp, as shown in Fig. 12, consists of a pair of spring-jaws 61 opened and closed by a sliding sleeve 62.

In a vertical groove 63 (Fig. 5), formed in the middle of plate 42, and on a rod 64 in front of said groove, is guided a gage-block or traveler 65 having a pair of prongs 66 whereby it may be clipped or fastened to the assemblage of wires substantially at the point 67 (Fig. 14) at the upper end of the braided covering, this traveler coacting with two pointers 68, 69, located at different heights on the plate 42, to indicate respectively the position of the work at the time for cutting off the lower ends of the wires, and its position at the time for terminating the braided covering 26 and beginning the tail or extension 27 which finishes the lower end thereof. These pointers 68, 69 are preferably contact members engaged by the traveler 65, and hence each is pivotally mounted at 70 and provided with a heel stop 71, whereby the traveler may be allowed to proceed upwardly after engaging either pointer.

The position of the parts when the work is started is represented in Fig. 4, with the exception that the wires, led in below from suitable reels, are omitted in this view, but may be supposed to have their ends secured at three different heights in the fastener prongs 36 as seen in Fig. 2, the wires being left in this position from a preceding operation. The puller clamp 60 is shown drawn down and attached to the severed lower part of terminal sheath 27 formed of the ends of the threads leading from the several spools 29, and embracing the hemp core 25 which comes up through the center of the guide 34, which part 27 becomes the upper terminal sheath of the wire assembly about to be covered. The operator releases the ends of the wires from the fastener prongs 36 and draws them separately or in pairs successively upward through the middle of the machine, through the guide 34, between the braiding threads and around the puller clamp 60, and fastens them individually between their proper fastening prongs 45 upon the holders 43, gaging their positions by the stops 46 located immediately above the several pairs of prongs, the resulting positions of the wires being represented in Fig. 1. The individual coverings of the several wires are differently colored, as usual in wiring systems, and the operator learns to assign them to their proper guides and gages by color. The machine is then started so as to braid the covering 26 upon the group of wires, clutch 49, 50 being engaged so that the pulley wheel 47 is rotated and its cord 58 caused to draw the puller clamp 60 and with it the assemblage of wires upwardly through the machine. Until the first few courses of the sheath are braided on, the operator manually holds the group of wires about the puller clamp, so that they will feed upwardly with the latter, and at about the same time he releases the upper ends of the wires from the fastener prongs 45 so that these ends may rise during the braiding operation, the feeding being automatic as soon as the forming sheath binds the wires and core together. When the upper end of the sheath reaches the level of the traveler block 65, the latter is fastened thereon by means of its prongs 66, and when said traveler has been carried up to the level of the lowermost pointer 68, the machine is stopped by the operator, and with a pair of shears he cuts off the lower ends of the wires just above the gages 37 so as to terminate these ends at the three different lengths represented in Figs. 2 and 14, and at the same time he fastens the ends of the inleading wires between the prongs 36 for the next operation. The machine is then re-started and braiding is continued until traveler 65 reaches the upper pointer 69 (Fig. 3), when the machine is again stopped and the operator pulls up the lower ends of the wires and spreads them outwardly above the threads at the braiding point as shown in Fig. 3, whereupon the machine is again started and the lower terminal sheath 27 is braided. He then finally stops the machine, cuts the hemp core 25 in the middle of the terminal sheath, allows the cut end to drop with the sheath threads over the spools, unfastens the puller clamp 60, removes and lays aside the finished work, releases the clutch 49, 50, so as to allow reverse rotation of the pulley wheel 47, draws down the puller clamp 60 and attaches it to the cut-off end of the terminal sheath 27 on the upper end of the hemp core for the next wire assembly, and by rotating the pulley wheel by hand brings said clamp back to the position shown in Fig. 4, after which the foregoing operations are repeated on the next piece of work.

I claim:

1. In a wire-assembling machine, the combination of means for binding together a bundle of wires with their ends at different relative positions, and a series of gages located at different longitudinal positions corresponding to the respective end-positions of the wires.

2. In a wire-assembling machine, the combination of means for binding together a bundle of wires, a series of gages for determining the end-positions of the several wires, and means for temporarily holding the wire ends adjacent to the respective gages.

3. In a wire-assembling machine, the combination of means for binding together a bundle of wires, and associated means for temporarily holding the ends of the wires in stationary positions.

4. In a wire-assembling machine, the combination of means for progressively binding together a bundle of wires, and a series of gages posterior to the binding means for positioning the advance ends of the respective wires.

5. In a wire-assembling machine, the combination of means for progressively binding together a bundle of wires, a series of gages in different longitudinal positions posterior to said binding means for determining the positions of the advance ends of the respective wires at the beginning of operation of said binding means, and means associated with the several gages for temporarily holding the ends of the wires at the gages.

6. In a wire-assembling machine, the combination of means for progressively binding together a bundle of wires, and a series of wire-end-gages in different longitudinal positions anterior to the binding means.

7. In a wire-assembling machine, the combination of means for progressively feeding a bundle of wires of indefinite lengths, means for binding said wires together, a series of anterior gages for determining the rear-end severing-points, and fastening devices anterior to said gages for temporarily holding the severed ends of the inleading wires.

8. In a wire-assembling machine, the combination of means for progressively feeding a bundle of wires of indefinite lengths, means for progressively binding together said wires, a series of end-gages in different longitudinal positions posterior to the binding means, and a series of end-gages in different longitudinal positions anterior to said binding means.

9. In a wire-assembling machine, the combination of means for progressively feeding a bundle of wires of indefinite lengths, means for progressively binding said wires together, a series of posteriorly located end-gages and associated wire-end-fasteners, and a series of anteriorly located end-gages and associated wire-end-fasteners.

10. In a wire-assembling machine, the combination of means for feeding a bundle of wires, means for braiding a covering thereon, and a series of gages for determining the end-positions of the several wires.

11. In a wire-assembling machine, the combination of means for feeding a bundle of wires, means for applying a braided covering to the intermediate portion of said bundle, and two series of gages for determining the positions of the ends of the several wires with respect to each other and the braided covering at the respective ends of the bundle.

12. In a wire-assembling machine, the combination of means for feeding a bundle of wires vertically upward, means for braiding a covering thereon, and a series of wire-end-gages located at different heights above the braiding point.

13. In a wire-assembling machine, the combination of means for feeding a bundle of wires vertically upward, means for braiding a covering thereon, and a series of wire-end-gages located at different heights below the braiding point.

14. In a wire-assembling machine, the combination of means for feeding a bundle of wires vertically upward, means for braiding a covering thereon, a series of wire-end-gages located at different heights, and wire-end-fasteners located below the respective gages.

15. In a wire-assembling machine, the combination of means for feeding a bundle of wires vertically upward, means for braiding a covering thereon, a series of wire-end-gages located at different heights above the braiding point, wire-end-fasteners located immediately below the respective gages, a series of wire-end-gages located below the braiding point, and a series of wire-end-fasteners located immediately below the last-said gages.

16. In a wire-assembling machine, the combination of means for progressively binding together a bundle of wires, and a posterior series of stop-gages for determining the positions of the advance ends of the respective wires.

17. In a wire-assembling machine, the combination of means for progressively binding together a bundle of wires, a posterior series of stop-gages for determining the positions of the advance ends of the respective wires, and wire-end-fasteners associated with said stop-gages.

18. In a wire-assembling machine, the combination of means for binding together a bundle of wires, and a series of fasteners for temporarily holding the wire ends stationary, each fastener comprising a pair of fixed prongs between which the wire is forced and frictionally held.

19. In a wire-assembling machine, the combination of means for progressively feeding a bundle of wires of indefinite lengths, means for progressively binding said wires together, and an anterior series of gages for determining the severing positions of the rear ends of the wire in the bundle, said gages forming wire guides.

20. In a wire-assembling machine, the combination of means for progressively feeding a bundle of wires, means for braiding a covering thereon, an anterior series of gages for determining the rear-end-positions of the respective wires, and a posterior indicator adjacent to the path of the wire bundle for determining, with reference to the position of the advance end of the braided covering, the desired point in the travel of the wire assemblage at which the rear end of the wires should be severed from the inleading wires at said gages.

21. In a wire-assembling machine, the combination of means for progressively feeding a bundle of wires, means for braiding a covering thereon, an anterior series of wire-end-gages, and two posterior braid-end pointers located in different positions longitudinally of the path of the wire assemblage for determining respectively the feeding points for severing the rear ends of the wires at said gages and for forming the rear termination of the braided covering.

22. In a wire-assembling machine, the combination of means for progressively feeding a bundle of wires, means for braiding a covering thereon, a traveler having means for temporarily attaching it to the braided covering, and a stationary position-indicator adjacent to the path of said traveler.

23. In a wire-assembling machine, the combination of means for progressively feeding a bundle of wires, means for braiding a covering thereon, a traveler having means for temporarily attaching it to the braided covering, and a stationary, pivoted contact-pointer adjacent to and having its end in the path of said traveler.

24. In a wire-assembling machine, the combination of means for feeding a bundle of wires vertically upward, means for braiding a covering thereon, an anterior series of rear-end wire-gages, a traveler having means for temporarily attaching it to the braided covering, and a series of contact members mounted in successive positions above the braiding point, in and adjacent to the path of said traveler, and adapted to be moved by the latter.

25. In a wire-assembling machine, the combination of means for progressively binding together a bundle of wires, and means for feeding said bundle comprising a puller, a power shaft, and means for connecting said puller to and disconnecting it from the power shaft.

26. In a wire-assembling machine, the combination of means for braiding a covering upon a bundle of wires, and means for feeding said bundle vertically upward comprising a puller clamp, a pulley wheel, a cord attached at one end to said clamp and at its other end to said pulley wheel, a power shaft for rotating said pulley wheel to draw the puller clamp upwardly, and a clutch for connecting said pulley wheel to the power shaft and disconnecting it therefrom to permit the free reverse rotation of the pulley wheel.

In testimony whereof I have hereunto set my hand this 10th day of March, 1917.

CHARLES R. EVANS.